United States Patent
Enns et al.

(10) Patent No.: US 8,544,813 B2
(45) Date of Patent: Oct. 1, 2013

(54) VEHICLE SEAT, IN PARTICULAR COMMERCIAL VEHICLE SEAT

(75) Inventors: Viktor Enns, Kaiserslautern (DE); Thomas Weber, Kaiserslautern (DE); Thomas Gundall, Queidersbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 220 days.

(21) Appl. No.: 13/130,428

(22) PCT Filed: Jun. 24, 2010

(86) PCT No.: PCT/EP2010/003889
§ 371 (c)(1), (2), (4) Date: May 20, 2011

(87) PCT Pub. No.: WO2011/000526
PCT Pub. Date: Jan. 6, 2011

(65) Prior Publication Data
US 2011/0226930 A1    Sep. 22, 2011

(30) Foreign Application Priority Data
Jul. 2, 2009   (DE) .................. 10 2009 031 415

(51) Int. Cl.
*F16M 13/00*   (2006.01)
*A47C 1/00*    (2006.01)

(52) U.S. Cl.
USPC ....... 248/588; 248/421; 248/569; 297/344.12

(58) Field of Classification Search
USPC .............. 248/564, 569, 588, 420, 421, 423, 248/424, 429; 297/344.15, 344.16, 344.12
See application file for complete search history.

(56) References Cited

U.S. PATENT DOCUMENTS

| | | | | |
|---|---|---|---|---|
| 5,169,112 A | * | 12/1992 | Boyles et al. | 248/550 |
| 5,251,864 A | | 10/1993 | Itou | |
| 5,358,305 A | * | 10/1994 | Kaneko et al. | 296/65.02 |
| 5,871,198 A | * | 2/1999 | Bostrom et al. | 248/588 |
| 6,866,236 B2 | * | 3/2005 | Mullinix et al. | 248/421 |
| 8,303,037 B2 | * | 11/2012 | Weber et al. | 297/344.15 |
| 2007/0295882 A1 | * | 12/2007 | Catton | 248/588 |
| 2010/0072800 A1 | * | 3/2010 | Weber et al. | 297/344.15 |
| 2011/0226930 A1 | * | 9/2011 | Enns et al. | 248/569 |

FOREIGN PATENT DOCUMENTS

| | | |
|---|---|---|
| DE | 102008023121 A1 | 11/2009 |
| EP | 1527946 A2 | 5/2005 |
| JP | 63098228 U | 6/1988 |
| JP | 6316233 A | 11/1994 |
| WO | WO8809270 A1 | 12/1988 |

* cited by examiner

*Primary Examiner* — Tan Le

(74) *Attorney, Agent, or Firm* — McGlew and Tuttle, P.C.

(57) ABSTRACT

A vehicle seat, particularly a commercial-vehicle seat is provided with a scissor-type stand (3) which is able to vibrate and which is provided with a top frame (7), two first rocker arms (8a) and two second rocker arms (8b), which intersect in pairs at a scissor axis (10) extending in a transverse seat direction (y). The first two rocker arms (8a) are connected with one another at one end via a transverse tube (18) which extends in the transverse seat direction (y) and are pivotably mounted on the top frame (7) and able to vibrate in the longitudinal seat direction (x) via a bearing mechanism (20). The transverse tube (18) can be locked with the top frame (7) via at least one locking device (31).

17 Claims, 3 Drawing Sheets

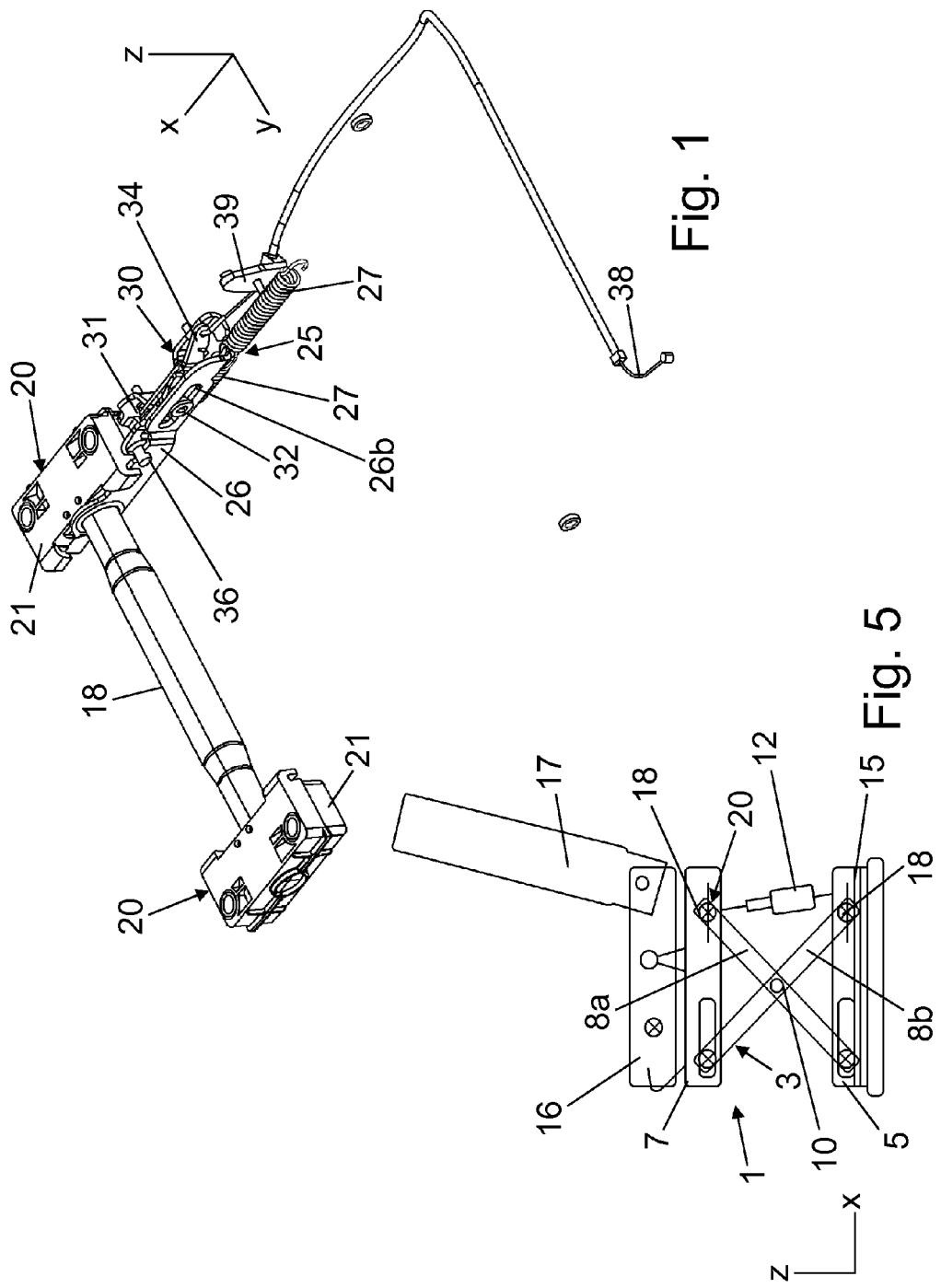

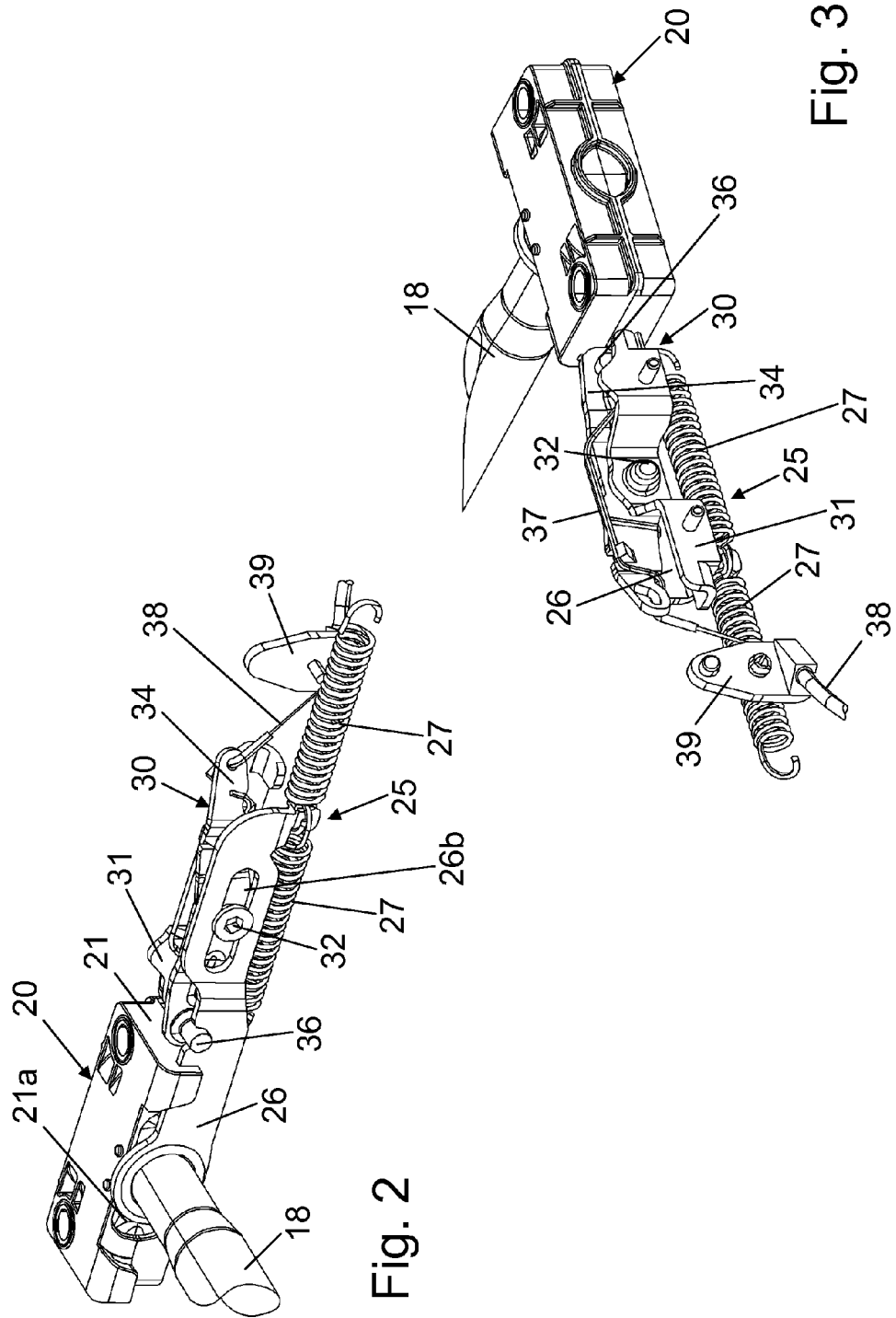

US 8,544,813 B2

VEHICLE SEAT, IN PARTICULAR COMMERCIAL VEHICLE SEAT

CROSS REFERENCE TO RELATED APPLICATIONS

This application is a United States National Phase application of International Application PCT/EP2010/003889 and claims the benefit of priority under 35 U.S.C. §119 of German Patent Application DE 10 2009 031 415.6 filed Jul. 2, 2009, the entire contents of which are incorporated herein by reference.

FIELD OF THE INVENTION

The invention relates to a vehicle seat, in particular a commercial vehicle seat, having a scissors-type stand that can vibrate in the principal direction of vibrations and which comprises a top frame, two first rocker arms and two second rocker arms that intersect in pairs at a scissor axis extending in a transverse seat direction, the first two rocker arms being connected with one another at one end by means of a transverse tube extending in the transverse seat direction.

BACKGROUND OF THE INVENTION

A vehicle seat of this type and known from use has a transverse bar as a viscoelastic element, which is fastened at the end to the top frame and centrally to the rear transverse tube, in order to dampen vibrations of the scissors-type stand in the longitudinal seat direction. In DE 10 2008 023 121 A1, which has been post-published, a further vehicle seat of this kind is described, with which the transverse tube rests in a bearing mechanism at the top frame by means of two dampening elements made of an elastomer and is thus able to vibrate in the longitudinal seat direction.

SUMMARY OF THE INVENTION

The object of the invention is to improve a vehicle seat of the aforementioned type. This object is achieved according to the invention by a vehicle seat that can vibrate in the principal direction of vibrations and which comprises a top frame, two first rocker arms and two second rocker arms that intersect in pairs at a scissor axis extending in a transverse seat direction. The first two rocker arms are connected with one another at one end by means of a transverse tube extending in the transverse seat direction. The transverse tube is pivotably mounted on the top frame by at least one bearing mechanism. The top frame is able to vibrate (move) in the longitudinal seat direction relative to the transverse tube by means of at least one pivoting means. The horizontal vibrations of the top frame in the longitudinal seat direction are undamped by the pivoting means in the case of minor deflections and damped by the bearing mechanism in case of major deflections.

As a result of the pivoting means, the scissors-type stand may absorb vibrations in the longitudinal seat direction, i.e. horizontal vibrations of the top frame relative to the transverse tube, which, in the case of minor deflections are undamped, and which are damped by the bearing mechanism between top frame and transverse tube only in the case of major deflections. This increases seating comfort, since the occupant is isolated from force impacts on the seat frame. The bearing mechanism has a dampening effect, in order to gently limit the deflections in the event of heavy force impacts.

In a configuration having a simple design, the pivoting means preferably is provided with a stay which is suspended by means of springs. The stay is preferably hinged to the transverse tube, so that the springs act between stay and top frame. The bearing mechanism, having a simple design, is provided with a guide with a guideway for the transverse tube, preferably for a bearing roller of the transverse tube. Dampening, i.e. energy dissipation, preferably takes place by means of limit stops of the bearing mechanism, such limit stops being preferably made of an elastomer. The guide can be configured as a largely closed unit with guideway and limit stops in its interior, into which the transverse tube protrudes through an opening. Such a bearing mechanism can be provided on both ends of the transverse tube.

If, depending on the driving situation, no isolation from vibrations is requested, the transverse tube can be locked with the assigned top frame by means of a locking device, thus suppressing the horizontal vibrations. A locking lever which is prestressed and is pivotable, for example by means of a Bowden cable, is preferably provided for this purpose.

The term "transverse tube" is not intended to be restricted to circular cross sections and to hollow profiles, but generally to denote the component connecting the rocker arms (or a component in turn connected thereto, for example a pin in the transverse seat direction). Instead of being provided between top frame and transverse tube, the combination of bearing mechanism and pivoting means can alternatively or additionally be provided between top frame and transverse tube. The bearing mechanism is preferably provided on both sides of the vehicle seat, the pivoting means preferably on exactly one side of the vehicle seat.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective partial view of the exemplary embodiment according to the invention with two bearing mechanisms, pivoting means and locking device;

FIG. 2 is a further perspective partial view showing the embodiment of FIG. 1;

FIG. 3 is another perspective partial view showing the embodiment of FIG. 1;

FIG. 5 is a schematic side view of the exemplary embodiment.

DESCRIPTION OF THE PREFERRED EMBODIMENTS

Figure 4:
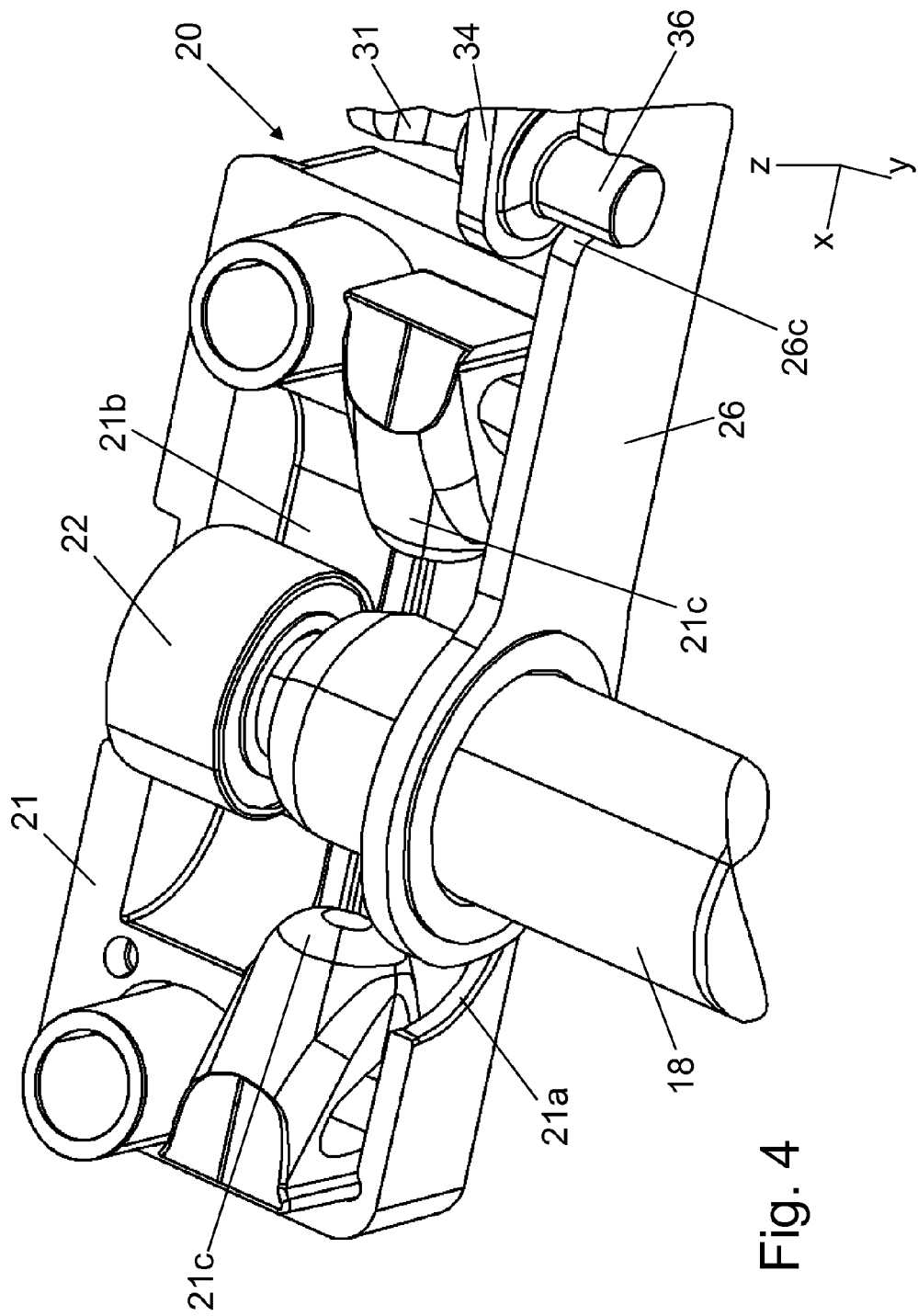
FIG. 4 is a partial sectional view of the bearing mechanism.

Referring to the drawings in particular, a vehicle seat 1 for a commercial vehicle or a different type of motor vehicle has a scissors-type stand 3, which comprises a bottom frame 5, a top frame 7 arranged above said bottom frame, and on both sides a pair of intersecting rocker arms 8a and 8b each. A scissor axis 10 connects the two points of intersection and at the same time defines the axis extending in the transverse seat direction y, about which the rocker arms 8a and 8b may pivot relative to one another. The rocker arms 8a and 8b are pivotably mounted at their rear end to the top frame 5 and/or to the bottom frame 7 respectively—in a manner disclosed below in more details—and in each case are provided at their front end with rotatable rollers, by means of which they are movably guided in or at the top frame 7 and/or bottom frame 5 in the longitudinal seat direction x. Due to this movement of the rocker arms 8a and 8b, the height of the top frame 7 over the bottom frame 5 alters, hereinafter denoted in short as the height of the scissors-type stand 3. Due to a spring 12 and preferably a damper, the scissors-type stand 3 becomes a system which is able to oscillate and which increases seating comfort. The principal direction of oscillation of the scissors-type stand 3, which in an ideal case corresponds to the vertical, is denoted by z.

The scissors-type stand 3 is, in the exemplary embodiment, able to be displaced by means of seat rails 15 in the longitudinal seat direction x, whereby the vehicle seat 1 is longitudinally adjustable, i.e. its longitudinal seat position may be adjusted. The vehicle seat 1 also has a seat frame 16 which, on the one hand, in its rear region is hinged on both sides to the top frame 7 and, on the other hand, in its front region may be lifted and lowered by means of an inclination adjuster, and its inclination can thus be adjusted relative to the scissors-type stand 3. The vehicle seat 1 also has a backrest 17 which is attached to the seat frame 16 (or alternatively to the top frame 7)—in the exemplary embodiment with the possibility of adjusting its inclination.

Each of the two pairs of intersecting rocker arms 8a and 8b, comprises a first rocker arm 8a and a second rocker arm 8b, the inside of the first rocker arm 8a and the outside of the second rocker arm 8b facing one another. The two first rocker arms 8a are fixedly connected to one another at their rear end, in the exemplary embodiment the upper end, by means of a transverse tube 18 which extends parallel to the scissor axis 10 in the transverse seat direction y. The transverse tube 18 is mounted on both sides by means of one bearing mechanism 20 each, on the top frame 7. The two second rocker arms 8b are fixedly connected to one another at their rear end, in the exemplary embodiment the lower end, by means of a transverse tube 18 which is pivotably mounted on the lower frame 5. The last-mentioned transverse tube 18 can be mounted directly on the bottom frame 5, or by means of further bearing mechanisms 20. The other ends of the rocker arms 8a or 8b which correspond to one another are fixedly connected to one another by means of further transverse tubes, these front transverse tubes bearing the rollers.

The top frame 7 (and the bottom frame 5) have a C-shaped profile which is open in the transverse seat direction y toward the transverse tube 18 and on both vehicle seat sides receives the associated bearing mechanism 20. The bearing mechanism 20 has a guide 21, which is fastened to the top frame 7 (or to the bottom frame 5), for example by means of screws. The guide 21 is a box-shaped, largely closed unit. The transverse tube 18 protrudes into the guide 21 through an opening 21a. The guide 21 has, in its interior, a guideway 21b extending in the longitudinal seat direction x, for a bearing roller 22. The guideway 21b preferably has a horizontal (i.e. extending in the longitudinal seat direction x and in the transverse seat direction y) area and an area which, in the longitudinal seat direction x, is adjacent on both sides and extends upward (in the principal direction of oscillation z), for example a quarter-cylinder. The bearing roller 22 is pivotably mounted on the end of the transverse tube 18. The bearing roller 22 preferably is a ring which rests on the end section of the transverse tube 18—the diameter of which is reduced—by means of a needle bearing.

The guide 21, on the side of the guideway 21b, has two end stops 21c for interacting with the transverse tube 18. The two limit stops 21c are arranged in the longitudinal seat direction x in front of and behind the transverse tube 18. The bearing roller 22 can roll off along the guideway 21b in one direction at a time, until the transverse tube 18 comes to bear against the assigned limit stop 21c. The opening 21a is configured to be an oblong hole, according to this movement. The two limit stops 21c preferably consist of rubber, EPDM or another elastomer or other kind of plastic material. The two limit stops 21c absorb kinetic energy as elastic energy and preferably are also able to dissipate it (at least partially), i.e. they preferably act in a dampening manner. The dampening behavior can be determined by the shape of the limit stops 21c.

On one of the two sides of the vehicle seat, alternatively on both sides, the bearing mechanism 20 is combined with a pivoting means 25, which enables the top frame 7 to vibrate in the longitudinal seat direction x (horizontal vibration), relative to the rocker arms 8a, 8b, such vibration being independent of the oscillation in the principal direction of oscillation z. Force impacts occurring in the longitudinal seat direction x, for example due to uneven road surfaces or due to the coupling of trailers to the commercial vehicle, or corresponding components thereof in the longitudinal seat direction x, are thus absorbed and damped by the scissors-type stand 3, instead of being transmitted to the occupant. This increases seating comfort.

A stay 26 is hinged to the transverse tube 18, in the present embodiment the transverse tube 18 is stuck through a bearing bush which rests in a bearing eye of the stay 26, so that the transverse tube 18 can still rotate. The stay 26 is guided forward from the transverse tube 18 in the longitudinal seat direction x, within the profile of the top frame 7. A spring arrangement, in the exemplary embodiment two springs 27, is provided between the stay 26 and the top frame 7. The two springs 27 which preferably are pullback springs, are fixed, preferably suspended, at one end of the stay 26 each. Of the two springs 27, a front spring 27 is guided forward and a rear spring 27 is guided backward in the longitudinal seat direction x. Each of the two springs 27 is fixed, preferably suspended, to the top frame 7 at its other end. The rear spring 27 can be suspended also on the bearing mechanism 20.

The horizontal vibrations of the top frame 7 are undamped around the central position, i.e. when, in the case of minor deflections, only the springs 27 are effective, whilst, after having been in contact with the limit stops 21c, i.e. if these become effective in the case of major deflections they are dampened. Optionally, on the opposite side of the vehicle seat, where no pivoting means 25 must be present, an additional damper can be provided between a corresponding stay 26 and the top frame 7, which then can be effective over the whole range of the horizontal vibrations.

To suppress the horizontal vibrations in case of necessity, the pivoting means 25 is combined with a locking device 30. The locking device 30 which is arranged in the longitudinal seat direction x in front of the bearing mechanism 20, has a support 31 which is arranged at a distance to the stay 26, preferably within the profile of the top frame 7. The support 31 is fixed to the top frame 7, for example in the transverse seat direction y by means of projecting screws. The support 31 bears a bearing bolt 32. The bearing bolt 32 projects from the support 31 towards the stay 26 and protrudes through a slot 26b of the stay 26. The bearing bolt 32 is secured axially by a head, in the exemplary embodiment on the side of the stay 26 facing away from the support 31, and by a screwed-on nut, in the exemplary embodiment on the side of the support 31 which is facing away from the stay 26.

A locking lever 34 of the locking device 30 is pivotably mounted on the support 31 by means of the bearing bolt 32.

The two-armed locking lever 34 has a locking element 36 on one arm, in the exemplary embodiment a bolt. If the locking element 36 cooperates with a locking receiver 26c at the stay 26, i.e. engages in it, the stay 26 and the support 31, and consequently the transverse tube 18 and the top frame 7, are interlocked. A locking spring 37 which acts between the locking lever 34 and the support 31, defines, by its prestress, the initial position of the locking mechanism, for example, the opened state. A Bowden cable 38, the cover of which is supported at the top frame 7 by means of a support 39, is suspended on the other arm of the locking lever 34. The Bowden cable 38 preferably is led to the front end of the upper frame 7, where it ends at a control element which must be activated by the occupant of vehicle seat 1 and which has means for locking the Bowden cable 38, such means being suitable for the prestress of the locking spring 37.

By means of the locking device 30, horizontal vibrations may be prevented or permitted, and namely in a reversible manner depending on whether the locking device 30 is locked or unlocked. The locking device 30 in both switching states permits the rotational movement of the transverse tube 18 about its own axis, which occurs during the pivoting movement of the first rocker arms 8a.

While specific embodiments of the invention have been described in detail to illustrate the application of the principles of the invention, it will be understood that the invention may be embodied otherwise without departing from such principles.

The invention claimed is:

1. A vehicle seat comprising a scissors-type stand that can vibrate in the principal direction of vibrations and which scissors-type stand comprises:
   a top frame;
   two first rocker arms and two second rocker arms that intersect in pairs at a scissor axis extending in a transverse seat direction;
   a transverse tube, the first two rocker arms being connected with one another at one end via the transverse tube extending in the transverse seat direction, wherein the transverse tube can be locked with the top frame by means of at least one locking device;
   a bearing mechanism, the transverse tube being pivotably mounted on the top frame by the bearing mechanism;
   a pivoting means for vibrating the top frame relative to the transverse tube in a longitudinal seat direction, wherein horizontal vibrations of the top frame in the longitudinal seat direction are undamped by the pivoting means in the case of minor deflections and are damped by the bearing mechanism in case of major deflections.

2. A vehicle seat as claimed in claim 1, wherein:
   a stay is hinged to the transverse tube;
   the pivoting means comprises a spring, which acts between the stay that is hinged to the transverse tube and the top frame.

3. A vehicle seat as claimed in claim 2, wherein the pivoting means is provided with the spring and another spring to provide two prestressed springs, one of said springs being guided forward from the stay, in the longitudinal seat direction, and one of said springs being guided backward from the stay, in the longitudinal seat direction.

4. A vehicle seat as claimed in claim 1, wherein the bearing mechanism is provided with one guide with a guideway for a bearing roller on the transverse tube.

5. A vehicle seat as claimed in claim 4, wherein the guide is configured as a box-shaped, largely closed unit, into which the transverse tube protrudes through an opening.

6. A vehicle seat as claimed in claim 1, wherein the bearing mechanism is provided with two limit stops for the transverse tube, the limit stops being configured as dampers and becoming effective in case of major deflections of the horizontal vibrations of the top frame.

7. A vehicle seat as claimed in claim 6, wherein the limit stops are made of rubber, EPDM or another elastomer which dissipates energy.

8. A vehicle seat as claimed in claim 2, wherein:
   the scissors-type stand comprises the locking device that locks the transverse tube with the top frame; and
   the locking device locks the top frame with the stay of the pivoting means.

9. A vehicle seat as claimed in claim 8, wherein the locking device is provided with a support and a locking lever which is hinged to the support, the locking lever getting a locking element and a locking receiver to interact.

10. A vehicle seat as claimed in claim 9, wherein the locking lever is provided with the locking element, and the stay is provided with the locking receiver.

11. A vehicle seat as claimed in claim 9, wherein the locking lever is hinged to the support by means of a bearing bolt, the bearing bolt protruding through a slot of the stay and being axially secured.

12. A vehicle seat as claimed in claim 11, wherein the locking lever is prestressed with respect to the support by means of a locking spring and is pivotable by means of a Bowden cable.

13. A vehicle seat comprising a scissors-type stand that can move in a principal direction of vibration of the scissors-type stand, the scissors-type stand comprising:
   a top frame;
   two first rocker arms;
   two second rocker arms each of the first rocker arms being connected to one of the second rocker arms to form two rocker arm pairs, each with a scissor axis extending in a transverse seat direction;
   a transverse tube, the first two rocker arms being connected with one another at one end by the transverse tube extending in the transverse seat direction;
   a bearing mechanism, the transverse tube being pivotably mounted on the top frame by the bearing mechanism;
   a pivoting means for movement of the top frame relative to the transverse tube in the a longitudinal seat direction, the bearing mechanism including damping structure that allows undamped horizontal movement of the top frame relative to the transverse tube within a defined movement range and dampens horizontal movement of the top frame relative to the transverse tube for horizontal movement larger than the defined movement range, wherein the bearing mechanism is provided with two spaced apart limit stops for damping movement of the transverse tube and for defining a distance of the defined movement range.

14. A vehicle seat as claimed in claim 13, wherein:
   a stay is hinged to the transverse tube;
   the pivoting means comprises a spring acting between the stay and the top frame.

15. A vehicle seat as claimed in claim 14, wherein the pivoting means is provided with the spring and another spring to provide two prestressed springs, one of said springs being guided forward from the stay, in the longitudinal seat direction, and one of said springs being guided backward from the stay, in the longitudinal seat direction.

16. A vehicle seat as claimed in claim 13, wherein:
   the transverse tube has a bearing roller; and the bearing mechanism is provided with a guide with a guideway receiving the bearing roller.

17. A vehicle seat as claimed in claim 16, wherein:
the guide is configured as a box-shaped unit with an opening; and
the transverse tube protrudes through the opening.

* * * * *